United States Patent
Watanabe et al.

(10) Patent No.: US 11,831,985 B2
(45) Date of Patent: Nov. 28, 2023

(54) CAMERA AND CONTROL METHOD

(71) Applicant: SONY SEMICONDUCTOR SOLUTIONS CORPORATION, Kanagawa (JP)

(72) Inventors: Takehito Watanabe, Kanagawa (JP); Mikita Yasuda, Kanagawa (JP); Naoya Haneda, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 15 days.

(21) Appl. No.: 17/310,887

(22) PCT Filed: Feb. 28, 2020

(86) PCT No.: PCT/JP2020/008242
§ 371 (c)(1),
(2) Date: Aug. 27, 2021

(87) PCT Pub. No.: WO2020/184215
PCT Pub. Date: Sep. 17, 2020

(65) Prior Publication Data
US 2022/0150409 A1 May 12, 2022

(30) Foreign Application Priority Data
Mar. 13, 2019 (JP) .................... 2019-045378

(51) Int. Cl.
*H04N 23/68* (2023.01)
*H04N 23/80* (2023.01)

(52) U.S. Cl.
CPC .......... *H04N 23/683* (2023.01); *H04N 23/80* (2023.01)

(58) Field of Classification Search
None
See application file for complete search history.

(56) References Cited

U.S. PATENT DOCUMENTS

| 10,360,695 | B1 * | 7/2019 | Jean ...................... H04N 19/137 |
| 2004/0008772 | A1 * | 1/2004 | Kojima ................ H04N 19/115 |
| | | | 375/E7.193 |
| 2007/0040917 | A1 * | 2/2007 | Kobayashi ........... H04N 19/197 |
| | | | 348/222.1 |

(Continued)

FOREIGN PATENT DOCUMENTS

| CN | 1465192 A | 12/2003 |
| EP | 1404134 A1 | 3/2004 |
| JP | 08-065565 A | 3/1996 |

(Continued)

OTHER PUBLICATIONS

International Search Report and Written Opinion of PCT Application No. PCT/JP2020/008242, dated May 19, 2020, 09 pages of ISRWO.

*Primary Examiner* — James M Hannett
(74) *Attorney, Agent, or Firm* — CHIP LAW GROUP

(57) ABSTRACT

The present technology relates to a camera, a control method, and a program capable of improving image quality. An image sensor captures an image, and an encoding unit encodes the image. A control unit controls a bit rate to be allocated to encode the image in response to a shake of the camera. The present technology is applicable to, for example, a camera that captures and encodes an image.

6 Claims, 5 Drawing Sheets

(56) References Cited

U.S. PATENT DOCUMENTS

2011/0007133 A1  1/2011  Imanishi
2014/0133548 A1* 5/2014  Mate .................... H04N 19/179
                                             375/240.02

FOREIGN PATENT DOCUMENTS

| JP | 2002-369142 A | 12/2002 |
| JP | 2011-017929 A | 1/2011 |
| JP | 2012-204991 A | 10/2012 |
| KR | 10-0893419 B1 | 4/2009 |
| WO | 2002/102085 A1 | 12/2002 |

\* cited by examiner

CAMERA AND CONTROL METHOD

CROSS REFERENCE TO RELATED APPLICATIONS

This application is a U.S. National Phase of International Patent Application No. PCT/JP2020/008242 filed on Feb. 28, 2020, which claims priority benefit of Japanese Patent Application No. JP 2019-045378 filed in the Japan Patent Office on Mar. 13, 2019. Each of the above-referenced applications is hereby incorporated herein by reference in its entirety.

TECHNICAL FIELD

The present technology relates to a camera, a control method, and a program, and particularly relates to, for example, a camera, a control method, and a program capable of improving image quality.

BACKGROUND ART

For example, there is proposed an imaging device that changes encoding characteristics in response to an imaging operation such as zooming, panning, or fading (see, for example, Patent Document 1).

CITATION LIST

Patent Document

Patent Document 1: Japanese Patent Application Laid-Open No. 08-065565

SUMMARY OF THE INVENTION

Problems to be Solved by the Invention

For example, in a digital camera, an image (moving image) is captured, encoded, and then stored (recorded). In image encoding, a high bit rate is allocated to an image with motion.

Examples of a case where there is a motion in an image encompass a case where a subject appearing in the image is moving, a case where a user is performing panning, tilting, or the like of the digital camera as an intentional operation, and a case where a shake of the digital camera (hereinafter, also referred to as "camera shake") is occurring due to, for example, a shake of hands that is not an intentional operation of the user.

Therefore, a high bit rate is allocated not only to an image in which the subject is moving and an image captured while, for example, being panned or tilted, but also to an image captured during camera shake.

However, the image captured during camera shake is an image whose image quality deteriorates due to the camera shake. Therefore, it is unnecessary to allocate a high bit rate. Further, because a high bit rate is allocated to the image captured during camera shake, a bit rate that is supposed to be allocated to an image whose image quality is desired to be improved is reduced, or it takes time until a sufficient bit rate is allocated to an image whose image quality is desired to be improved. Therefore, codec noise caused by encoding may be generated in the image, and the image quality may deteriorate.

The present technology has been made in view of such a situation, and an object thereof is to improve image quality.

Solutions to Problems

A camera of the present technology is a camera including: an image sensor that captures an image; an encoding unit that encodes the image; and a control unit that controls a bit rate to be allocated to encode the image in response to a shake of the camera.

A control method or a program of the present technology is a method of controlling a camera, the method including controlling a bit rate to be allocated to encode an image in response to a shake of the camera, the camera including an image sensor that captures the image, and an encoding unit that encodes the image, or a program for causing a computer to execute such a control method.

In the present technology, the bit rate to be allocated to encode the image is controlled in response to a shake of the camera.

Note that the camera may be an independent device, or may be an internal block included in a single device.

Further, the program can be provided by being transmitted via a transmission medium or by being recorded on a recording medium.

MODE FOR CARRYING OUT THE INVENTION

Digital Camera to Which Present Technology is Applied

Figure 1:
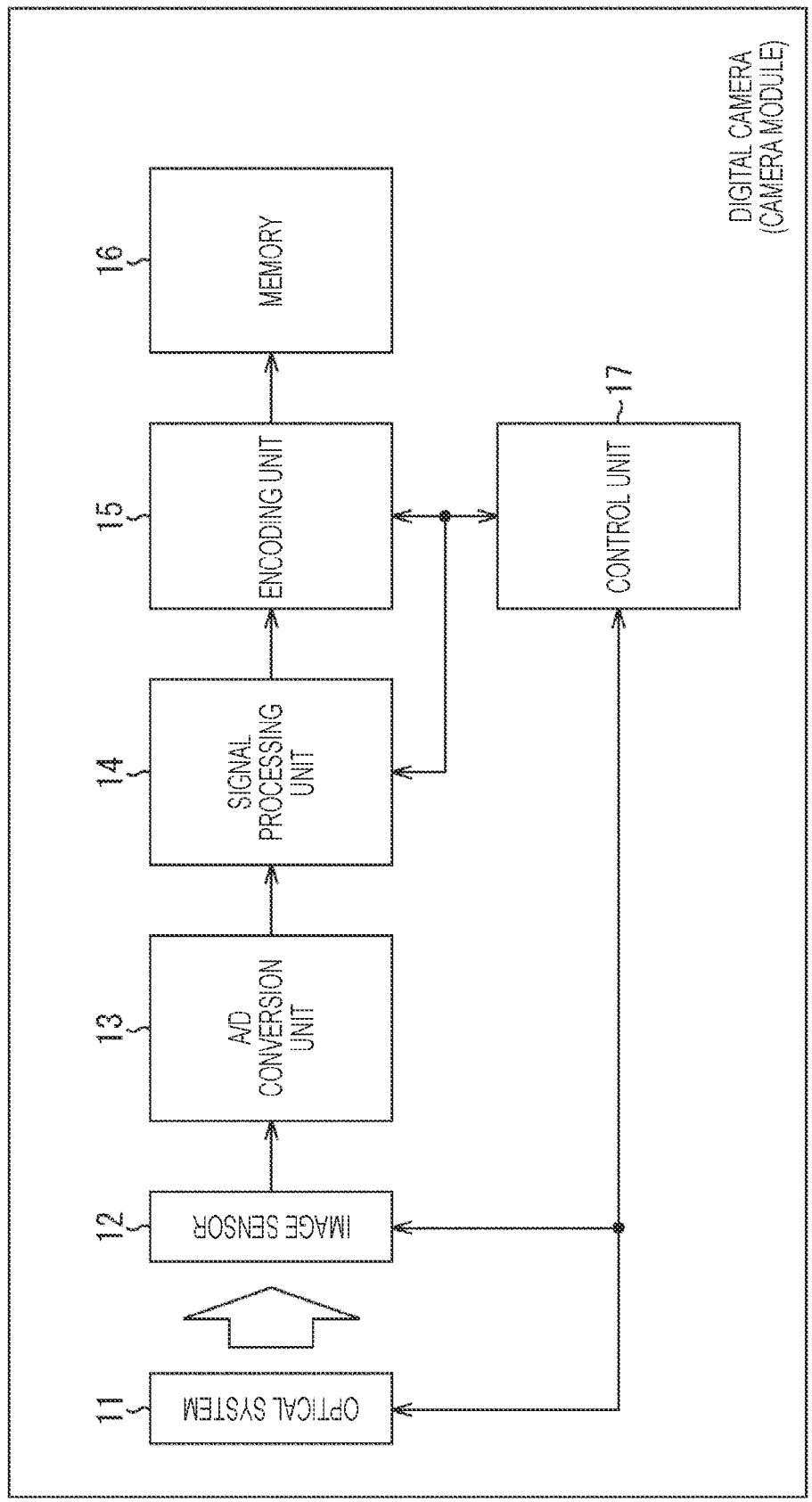
FIG. 1 is a block diagram showing a configuration example of an embodiment of a digital camera to which the present technology is applied.

FIG. 1 is a block diagram showing a configuration example of an embodiment of a digital camera to which the present technology is applied.

In FIG. 1, the digital camera includes an optical system 11, an image sensor 12, an analog to digital (A/D) conversion unit 13, a signal processing unit 14, an encoding unit 15, a memory 16, and a control unit 17.

The optical system 11 includes optical components such as a lens and a diaphragm, and condenses light from a subject on the image sensor 12.

The image sensor 12 performs image capturing of receiving light from the optical system 11 and performing photoelectric conversion at a predetermined frame rate, and outputs (a signal of) the captured image obtained by the image capturing to the A/D conversion unit 13.

The A/D conversion unit 13 performs A/D conversion on the captured image output from the image sensor 12, and supplies the captured image to the signal processing unit 14.

The signal processing unit 14 performs signal processing for improving image quality, such as white balance adjustment and noise removal, and other signal processing on the captured image supplied from the A/D conversion unit 13, and outputs the captured image to the encoding unit 15.

The encoding unit 15 encodes (compresses) the captured image output from the signal processing unit 14 in accordance with a predetermined encoding method such as an MPEG method (MPEG2, Advanced Video Coding (AVC), and the like), and supplies resultant encoded data to the memory 16.

The memory 16 stores the encoded data supplied from the encoding unit 15.

The control unit 17 controls the optical system 11, the image sensor 12, the signal processing unit 14, and the encoding unit 15.

For example, the control unit 17 controls the optical system 11 to adjust the diaphragm, a focus, a zoom, and the like. Further, the control unit 17 controls the image sensor 12 to adjust exposure time and the like. Furthermore, the control unit 17 controls the signal processing unit 14 to switch the signal processing performed by the signal processing unit 14.

Further, the control unit 17 controls a bit rate to be allocated to encode the captured image in the encoding unit 15 (an amount of encoded data obtained by encoding the captured image) in response to camera shake (a shake of the digital camera).

Processing of Control Unit 17

Figure 2:
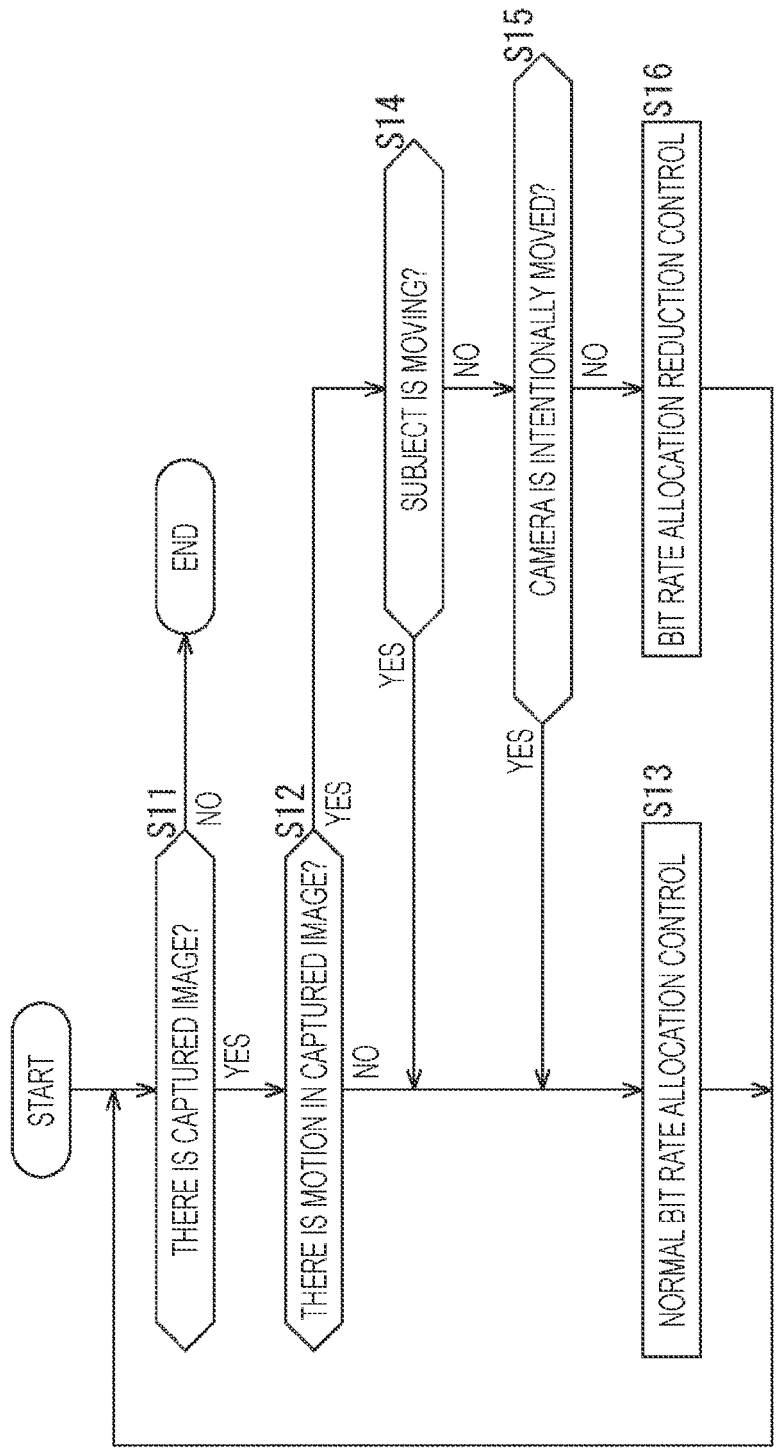
FIG. 2 is a flowchart showing an example of processing in which a bit rate is controlled by a control unit 17.

FIG. 2 is a flowchart showing an example of processing in which a bit rate is controlled by the control unit 17.

In step S11, the control unit 17 determines whether or not there is a captured image to be encoded by the encoding unit 15, and, in a case where the control unit 17 determines that there is no captured image to be encoded, the processing ends. Meanwhile, in a case where it is determined in step S11 that there is a captured image to be encoded, the processing proceeds to step S12.

In step S12, the control unit 17 determines whether or not there is a motion in the captured image to be encoded.

In a case where it is determined in step S12 that there is no motion in the captured image to be encoded, the processing proceeds to step S13.

In step S13, the control unit 17 performs normal bit rate allocation control for controlling a bit rate so that the bit rate is allocated in conformity with the definition of the encoding method of the encoding unit 15, and the processing returns to step S11. In this case, in response to the normal bit rate allocation control by the control unit 17, the encoding unit 15 allocates the bit rate in conformity with the definition of the encoding method of the encoding unit 15, and encodes the captured image.

Meanwhile, in a case where it is determined in step S12 that there is a motion in the captured image to be encoded, the processing proceeds to step S14.

In step S14, the control unit 17 determines whether or not the subject appearing in the captured image is moving. In a case where the control unit 17 determines that the subject appearing in the captured image is moving, the processing proceeds to step S13, and the above-described processing is performed.

Meanwhile, in step S14, in a case where it is determined that the subject appearing in the captured image is not moving, i.e., in a case where the motion in the captured image is caused by a motion of the digital camera, the processing proceeds to step S15. In step S15, the control unit 17 determines whether or not the digital camera is intentionally moved.

In step S15, in a case where it is determined that the digital camera is intentionally moved, i.e., in a case where the user performs an operation of intentionally moving the digital camera such as panning or tilting, the processing proceeds to step S13, and the above-described processing is performed.

Meanwhile, in step S15, in a case where it is determined that the digital camera is not intentionally moved, i.e., in a case where there is a motion in the captured image due to camera shake, the processing proceeds to step S16.

In step S16, the control unit 17 performs bit rate allocation reduction control for controlling a bit rate so that the bit rate to be allocated to encode the captured image is lower than that in the normal bit rate allocation control. Then, the processing returns to step S11. In this case, in response to the bit rate allocation reduction control by the control unit 17, the encoding unit 15 reduces the bit rate to be allocated to encode the captured image so that the bit rate is lower than that in the normal bit rate allocation control.

Therefore, in a case where, although there is a motion in the captured image, the subject appearing in the captured image is not moving or the user is not performing an operation of intentionally moving the digital camera, i.e., in a case where camera shake, such as a shake of hands that is not an intentional operation of the user, is occurring, the bit rate to be allocated to encode the captured image is reduced.

As a result, it is possible to prevent a bit rate from being wastefully consumed by allocating a high bit rate to a captured image whose image quality deteriorates due to camera shake. Further, it is possible to quickly allocate a high bit rate to a captured image whose image quality is desired to be improved (e.g., a captured image in which the subject moves fast). This makes it possible to improve the image quality of the captured image whose image quality is desired to be improved.

Note that the determination in steps S12, S14, and S15 can be performed by using a motion vector detected from the captured image for motion compensation, (a motion vector serving as) output of an acceleration sensor provided in the optical system 11 for hand shake correction, the image sensor 12, or the like for image stabilization, or the like.

Further, in the bit rate allocation reduction control, the control unit 17 can reduce a bit rate to be allocated to encode the captured image in accordance with a magnitude of the camera shake, i.e., as the camera shake is larger.

Furthermore, in a case where the control unit 17 stores a motion vector indicating a magnitude and direction of camera shake over a certain period of time and camera shake of a predetermined magnitude or more continues over the certain period of time, the control unit 17 can perform the bit rate allocation reduction control. In this case, the bit rate allocation reduction control is not performed when the camera shake instantaneously occurs, and the bit rate allocation reduction control can be performed only when the camera shake continues over the certain period of time.

Note that the control unit 17 can control not only a bit rate to be allocated to encode the captured image but also the signal processing in the signal processing unit 14 in response to camera shake. For example, it is possible to cause the signal processing unit 14 to perform signal processing for sharpening an image such as edge enhancement in a case where no camera shake occurs, and perform signal processing for smoothing such as noise removal in a case where camera shake occurs.

Figure 3:
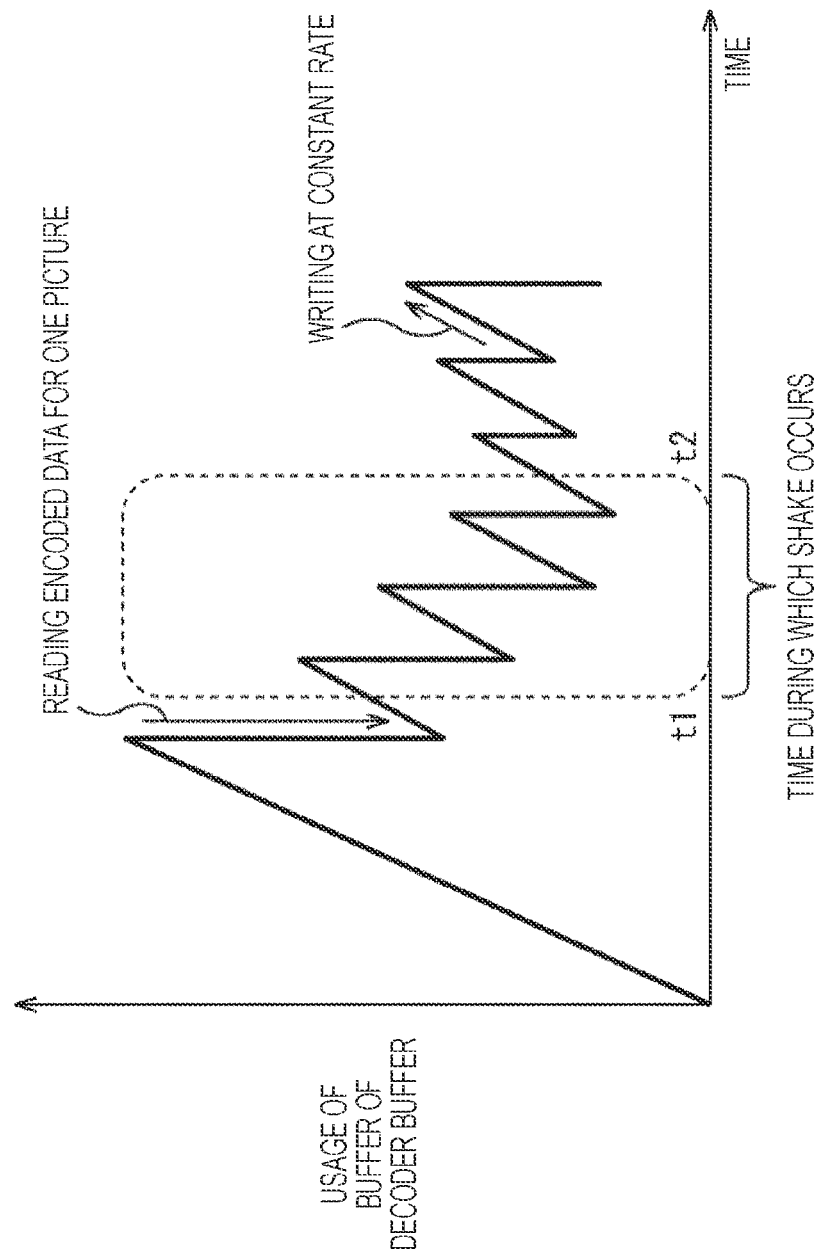
FIG. 3 illustrates an example of bit rate allocation performed in conformity with a definition of an encoding method of an encoding unit 15.

FIG. 3 illustrates an example of bit rate allocation performed in accordance with the definition of the encoding method of the encoding unit 15.

In FIG. 3, a vertical axis represents usage of a buffer (decoder buffer) of a decoder that decodes encoded data, and a horizontal axis represents time.

In the decoder buffer, encoded data is written at a constant rate, and encoded data for each picture is read at a cycle corresponding to the frame rate.

Therefore, in FIG. 3, a part where the usage of the decoder buffer is greatly reduced indicates that a high bit rate is allocated, and a part where the usage of the decoder buffer is slightly reduced indicates that a low bit rate is allocated.

In the encoding unit 15, a bit rate is allocated within a range in which overflow or underflow does not occur in the decoder buffer. Further, in the bit rate allocation performed in conformity with the definition of the encoding method of the encoding unit 15, in principle, a high bit rate is allocated to a captured image (picture) with motion in order to improve the image quality.

In FIG. 3, camera shake occurs between times t1 and t2. Further, according to FIG. 3, it can be confirmed that, in the bit rate allocation performed in conformity with the definition of the encoding method of the encoding unit 15, a relatively high bit rate is allocated in a period of time in which camera shake occurs, and, as a result, a bit rate allocated immediately after the camera shake is stopped is reduced. In this case, the image quality of the captured image immediately after the camera shake is stopped may deteriorate.

Figure 4:
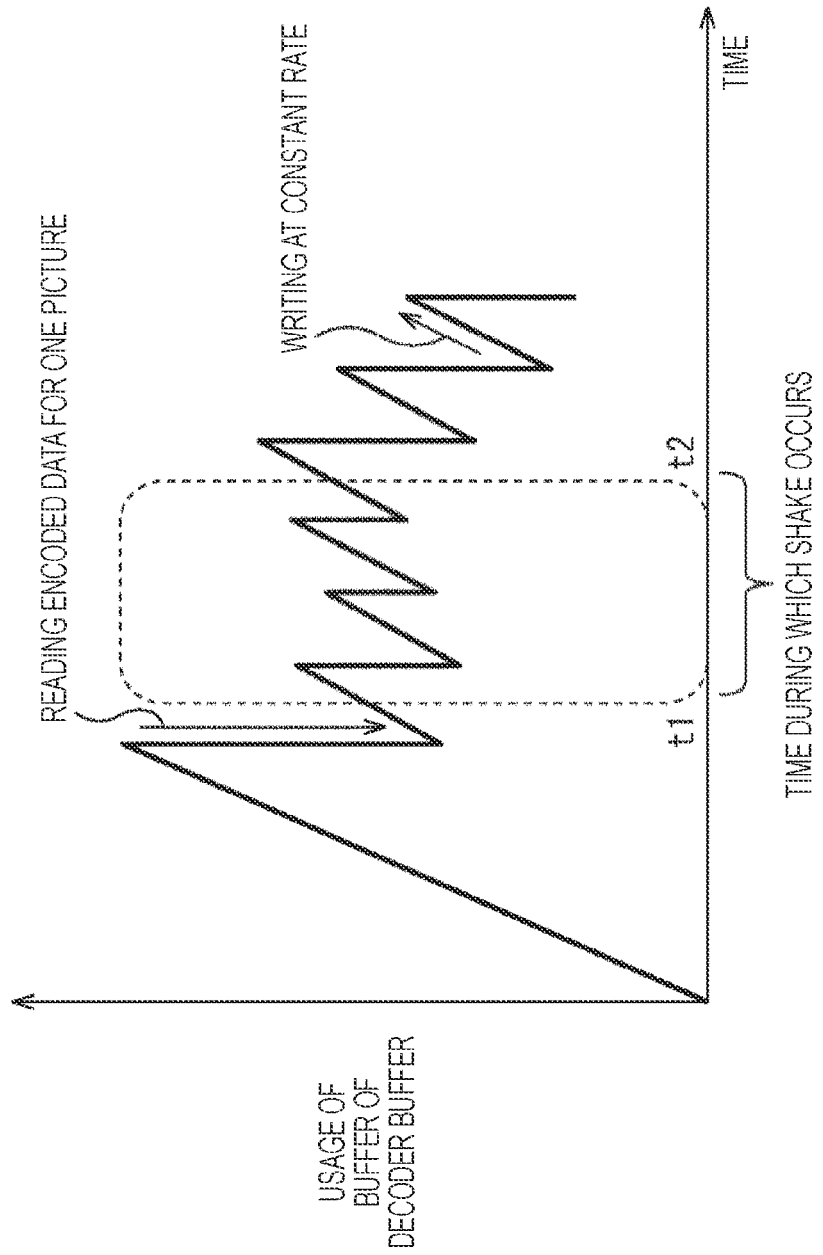
FIG. 4 illustrates an example of bit rate allocation performed under the control of the control unit 17.

FIG. 4 illustrates an example of the bit rate allocation performed under the control of the control unit 17.

In FIG. 4, as in FIG. 3, a vertical axis represents the usage of the decoder buffer, and a horizontal axis represents time.

In FIG. 4, as in FIG. 3, camera shake occurs between times t1 and t2. However, in FIG. 4, the bit rate allocation reduction control is performed in the period of time during which camera shake occurs, and an allocated bit rate is reduced. As a result, it is possible to quickly allocate a sufficient bit rate immediately after the camera shake is stopped, and it is possible to reduce the codec noise and improve the image quality.

As described above, the control unit 17 determines whether or not a motion in the captured image is camera shake (whether or not the subject is moving and whether or not the digital camera is intentionally moved), and reduces a bit rate in a case where the motion in the captured image is camera shake. This makes it possible to improve the image quality.

Description of Computer to Which Present Technology is Applied

Next, a series of processing of the control unit 17 described above can be performed by hardware or software. In a case where the series of processing is performed by software, a program forming the software is installed in a computer.

Figure 5:
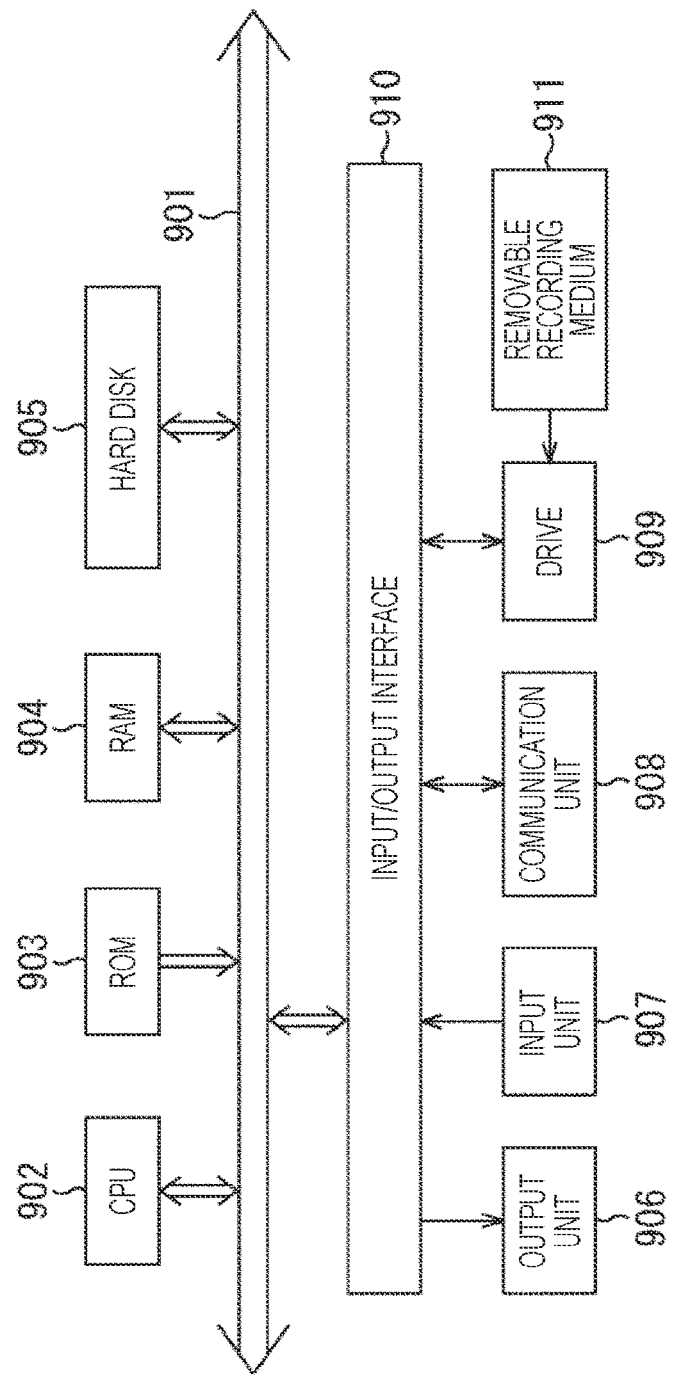
FIG. 5 is a block diagram showing a configuration example of an embodiment of a computer to which the present technology is applied.

FIG. 5 is a block diagram showing a configuration example of an embodiment of a computer in which a program for executing the series of processing described above is installed.

The program can be recorded in advance on a hard disk 905 or ROM 903 serving as a recording medium included in the computer.

Alternatively, the program can be stored (recorded) in a removable recording medium 911 driven by a drive 909. Such the removable recording medium 911 can be provided as so-called packaged software. Herein, examples of the removable recording medium 911 encompass a flexible disk, a compact disc read only memory (CD-ROM), a magneto optical (MO) disk, a digital versatile disc (DVD), a magnetic disk, and a semiconductor memory.

Note that the program can be installed in the computer from the removable recording medium 911 described above, or can be downloaded to the computer via a communication network or broadcast network and be installed in the built-in hard disk 905. That is, for example, the program can be wirelessly transferred from a download site to the computer via an artificial satellite for digital satellite broadcasting, or can be transferred by wire to the computer via a network such as a local area network (LAN) or the Internet.

The computer includes a central processing unit (CPU) 902, and the CPU 902 is connected to an input/output interface 910 via a bus 901.

When the user inputs a command via the input/output interface 910 by, for example, operating an input unit 907, the CPU 902 executes a program stored in a read only memory (ROM) 903 in response to the command. Alternatively, the CPU 902 loads the program stored in the hard disk 905 into a random access memory (RAM) 904 and executes the program.

Therefore, the CPU 902 performs the processing according to the flowchart described above or the processing performed by the configuration of the block diagram described above. Then, the CPU 902 outputs the processing result from an output unit 906 or transmits the processing result from a communication unit 908 via, for example, the input/output interface 910 as necessary, and, in addition, records the processing result on the hard disk 905, for example.

Note that the input unit 907 includes a keyboard, a mouse, a microphone, and the like. Further, the output unit 906 includes a liquid crystal display (LCD), a speaker, and the like.

Herein, in the present specification, the processing performed by the computer according to the program is not necessarily performed in time series in the order described as the flowchart. That is, the processing performed by the computer according to the program also includes processing executed in parallel or individually (e.g., parallel processing or processing by an object).

Further, the program may be processed by one computer (processor) or may be processed in a distributed manner by a plurality of computers. Furthermore, the program may be transferred to a remote computer and be executed therein.

Further, in the present specification, a system means a set of a plurality of components (devices, modules (parts), and the like), and it does not matter whether or not all the components are included in the same housing. Therefore, a plurality of devices included in separate housings and connected via a network and a single device including a plurality of modules in a single housing are both systems.

Note that the embodiments of the present technology are not limited to the above embodiments, and can be variously modified without departing from the gist of the present technology.

For example, the present technology can have a configuration of cloud computing in which a single function is shared and jointly processed by a plurality of devices via a network.

Further, each of the steps described in the above flowchart can be executed by a single device, or can be executed by being shared by a plurality of devices.

Furthermore, in a case where a single step includes a plurality of processes, the plurality of processes included in the single step can be executed by a single device, or can be executed by being shared by a plurality of devices.

Further, the effects described in the present specification are merely examples and are not limited, and additional effects may be exerted.

Note that the present technology can have the following configurations.

<1>
A camera including:
an image sensor that captures an image;
an encoding unit that encodes the image; and
a control unit that controls a bit rate to be allocated to encode the image in response to a shake of the camera.
<2>
The camera according to <1>, in which
the control unit reduces the bit rate to be allocated to encode the image as the shake of the camera is larger.
<3>
The camera according to <2>, in which
the control unit reduces the bit rate to be allocated to encode the image in a case where the shake of the camera continues over a certain period of time.
<4>
The camera according to <1> to <3>, in which
in a case where the shake of the camera does not occur, the control unit performs normal bit rate allocation control for controlling a bit rate so that the bit rate is allocated in conformity with a definition of an encoding method of the encoding unit, and
in a case where the shake of the camera occurs, the control unit performs bit rate allocation reduction control for controlling a bit rate so that the bit rate to be allocated to encode the image is lower than the bit rate in the normal bit rate allocation control.
<5>
The camera according to <1> to <4>, further including
a signal processing unit that performs signal processing of the image, in which
the control unit controls the signal processing in response to the shake of the camera.
<6>
A method of controlling a camera, the method including controlling a bit rate to be allocated to encode an image in response to a shake of the camera,
the camera including
an image sensor that captures the image, and
an encoding unit that encodes the image.
<7>
A program for causing a computer to function as
a control unit that controls a bit rate to be allocated to encode an image in response to a shake of a camera,
the camera including
an image sensor that captures the image, and
an encoding unit that encodes the image.

REFERENCE SIGNS LIST

11 Optical system
12 Image sensor
13 A/D conversion unit
14 Signal processing unit
15 Encoding unit
16 Memory
17 Control unit
901 Bus
902 CPU
903 ROM
904 RAM
905 Hard disk
906 Output unit
907 Input unit
908 Communication unit
909 Drive
910 Input/output interface
911 Removable recording medium

The invention claimed is:

1. A camera, comprising:
an image sensor configured to capture an image;
an encoding unit configured to encode the captured image; and
a control unit configured to:
determine a motion in the captured image;
determine, based on the determined motion, a subject in the captured image is static;
determine, based on the determination that the subject is static, at least one of a panning operation of the camera or a tilting operation of the camera is one of performed or not performed;
execute normal bit rate allocation control to allocate a first bit rate to encode the captured image, wherein
the first bit rate is in conformity with a definition of an encoding method of the encoding unit, and
the execution of the normal bit rate allocation control is based on the determined motion, the determination that the subject is static, and the determination that the at least one of the panning operation or the tilting operation is performed; and
execute bit rate allocation reduction control to allocate a second bit rate to encode the captured image, wherein
the second bit rate is lower than the first bit rate, and
the execution of the bit rate allocation reduction control is based on the determined motion, the determination that the subject is static, and the determination that the at least one of the panning operation or the tilting operation is not performed.

2. The camera according to claim 1, wherein the control unit is further configured to reduce, based on a magnitude of a shake of the camera, the first bit rate to be allocated to encode the captured image.

3. The camera according to claim 2, wherein the control unit is further configured to reduce, in a case where the shake of the camera continues over a certain period of time, the first bit rate to be allocated to encode the captured image.

4. The camera according to claim 1, further comprising a signal processing unit configured to execute signal processing operation on the captured image, wherein the control unit is further configured to control the signal processing operation based on a shake of the camera.

5. A method of controlling a camera including an image sensor that captures an image, and an encoding unit that encodes the captured image, the method comprising:
determining a motion in the captured image;
determining, based on the determined motion, a subject in the captured image is static;
determining, based on the determination that the subject is static, at least one of a panning operation of the camera or a tilting operation of the camera is one of performed or not performed;
executing normal bit rate allocation control to allocate a first bit rate to encode the captured image, wherein the first bit rate is in conformity with a definition of an encoding method of the encoding unit, and the execution of the normal bit rate allocation control is based on the determined motion, the determination that the subject is static, and the determination that the at least one of the panning operation or the tilting operation is performed; and executing bit rate allocation reduction control to allocate a second bit rate to encode the captured image, wherein the second bit rate is lower than the first bit rate, and the execution of the bit rate allocation reduction control is based on the determined motion, the determination that the subject is static, and the determination that the at least one of the panning operation or the tilting operation is not performed.

6. A non-transitory computer-readable medium having stored thereon, computer-executable instructions which, when executed by a computer, cause the computer to execute operations, the operations comprising:

controlling an image sensor of a camera to capture an image;

determining a motion in the captured image;

determining, based on the determined motion, a subject in the captured image is static;

determining, based on the determination that the subject is static, at least one of a panning operation of the camera or a tilting operation of the camera is one of performed or not performed;

executing normal bit rate allocation control to allocate a first bit rate to encode the captured image, wherein the first bit rate is in conformity with a definition of an encoding method of an encoding unit, and the execution of the normal bit rate allocation control is based on the determined motion, the determination that the subject is static, and the determination that the at least one of the panning operation or the tilting operation is performed; and executing bit rate allocation reduction control to allocate a second bit rate to encode the captured image, wherein the second bit rate is lower than the first bit rate, and the execution of the bit rate allocation reduction control is based on the determined motion, the determination that the subject is static, and the determination that the at least one of the panning operation or the tilting operation is not performed.

* * * * *